(12) United States Patent
Shen

(10) Patent No.: US 11,035,366 B2
(45) Date of Patent: Jun. 15, 2021

(54) THIN TYPE PUMP STRUCTURE

(71) Applicant: ASIA VITAL COMPONENTS (CHINA) CO., LTD., Shenzhen (CN)

(72) Inventor: Meng Shen, Shenzhen (CN)

(73) Assignee: Asia Vital Components (China) Co., Ltd., Shenzhen (CN)

( * ) Notice: Subject to any disclaimer, the term of this patent is extended or adjusted under 35 U.S.C. 154(b) by 63 days.

(21) Appl. No.: 16/221,598

(22) Filed: Dec. 17, 2018

(65) Prior Publication Data
US 2020/0191148 A1    Jun. 18, 2020

(51) Int. Cl.
| F04D 13/06 | (2006.01) |
| F04D 29/048 | (2006.01) |
| F04D 29/42 | (2006.01) |
| F04D 1/00 | (2006.01) |

(52) U.S. Cl.
CPC ....... *F04D 13/0626* (2013.01); *F04D 13/064* (2013.01); *F04D 29/048* (2013.01); *F04D 29/426* (2013.01); *F04D 1/00* (2013.01)

(58) Field of Classification Search
CPC ....... F04D 13/06–0606; F04D 13/0626; F04D 13/064; F04D 13/0653; F04D 5/002; F04D 5/008; F04D 7/02; F04D 13/066; F04D 13/0673; F04D 1/00; F04D 29/042; F04D 29/0473; F04D 29/048; F04D 29/426
USPC .......... 417/353, 423.1, 423.6, 423.7, 423.11, 417/423.12, 423.14, 423.15, 424.1, 352, 417/356
See application file for complete search history.

(56) References Cited

U.S. PATENT DOCUMENTS

| 6,302,661 | B1* | 10/2001 | Khanwilkar | ........ F04D 13/0646 |
| | | | | 415/900 |
| 2006/0099089 | A1* | 5/2006 | Hong | .................. F04D 13/0673 |
| | | | | 417/366 |
| 2007/0243086 | A1* | 10/2007 | Sakai | .................. F04D 13/0606 |
| | | | | 417/423.1 |

(Continued)

FOREIGN PATENT DOCUMENTS

| CN | 101451531 A | 6/2009 |
| CN | 102410231 A | 4/2012 |
| CN | 207319170 U | 5/2018 |

*Primary Examiner* — Alexander B Comley
(74) *Attorney, Agent, or Firm* — Thomas J. Nikolai; DeWitt LLP

(57) ABSTRACT

A thin type pump structure includes a pump housing, a rotor assembly, a stator assembly, a flow-guiding plate, and a closing member. The pump housing has a first side defining an open-topped pump chamber having a forward projected shaft and an opposite second side defining an open-bottomed annular recess at an area opposite to and around the pump chamber. The rotor assembly has a pivot hole and is received in the pump chamber with the pivot hole turnably around the shaft. The rotor assembly includes a blade wheel and a magnetic element located behind the blade wheel. The stator assembly is received in the annular recess to horizontally face toward the magnetic element, enabling mutual electromagnetic induction and magnetic field generation between the magnetic element and the stator assembly. The flow-guiding plate covers the pump chamber, and the closing member closes the pump housing from the first side thereof.

8 Claims, 5 Drawing Sheets

(56) References Cited

U.S. PATENT DOCUMENTS

2013/0028764 A1* 1/2013 Yokozawa .............. F04D 5/006
  417/423.7
2016/0025099 A1* 1/2016 Nakagawa .......... F04D 13/0626
  417/423.7

* cited by examiner

THIN TYPE PUMP STRUCTURE

FIELD OF THE INVENTION

The present invention relates to a thin type pump structure, and more particularly, to a thin type pump structure that has a largely reduced overall volume and an increased service life.

BACKGROUND OF THE INVENTION

While the currently available electronic apparatus have constantly enhanced computing power, their internal electronic elements also produce more heat during operation thereof. Heat sinks and/or radiating fins are usually provided on the heat-producing electronic elements to increase their heat dissipation areas and upgrade their heat dissipation performance. However, heat sinks and radiating fins can provide only very limited heat dissipation effect. Therefore, water-cooling devices have been adopted as a way to enhance the heat dissipation performance of the electronic apparatus.

According to a conventional water-cooling device, heat produced by a heat-producing element, such as a data processor or a graphic processor, is absorbed by the cooling liquid in the water-cooling device via heat exchange. The water-cooling device is connected to a heat sink via a plurality of tubular members, and the cooling liquid is circulated through the water-cooling device by a pump in the water-cooling device and exchanges heat with the heat sink, so that the heat-producing element can be quickly cooled.

FIG. 1 shows a pump structure 1 in a conventional water-cooling device includes a pump housing 10, a rotor assembly 11, a stator assembly (not shown), a flow-guiding plate 12, and a closing member 13. One side of the pump housing 10 forms a pump chamber 101, in which a shaft seat 102 is provided. The rotor assembly 11 has a shaft rotatably mounted on the shaft seat 102, and the stator assembly is received in another side of the pump housing 10 opposite to the pump chamber 101. The flow-guiding plate 12 correspondingly covers the pump chamber 101, and the closing member 13 correspondingly covers and closes the pump housing 10. When the conventional pump structure 1 starts operating, the shaft of the rotor assembly 11 is continuously in frictional contact with the shaft seat 102 of the pump housing 10 to cause mechanical wearing of the pump structure 1 and accordingly, a shortened service life thereof. Further, the frictional contact of the shaft of the rotor assembly 11 with the shaft seat 102 of the pump housing 10 tends to produce noise. In addition, the shaft seat 102 and the rotor assembly 11 require a mounting space in the pump housing 10, which necessitates the pump housing 10 to have a large axially extended space. As a result, the conventional pump structure 1 has a relatively large overall volume and thickness.

It is therefore tried by the inventor to develop an improved thin type pump structure that overcomes the drawbacks of the conventional pump structures.

SUMMARY OF THE INVENTION

A primary object of the present invention is to provide a thin type pump structure that has a largely reduced overall volume.

Another object of the present invention is to provide a thin type pump structure that has a largely reduced overall thickness.

A further object of the present invention is to provide a thin type pump structure that can be manufactured at a largely reduced cost.

A still further object of the present invention is to provide a thin type pump structure that has a largely reduced wearing rate and accordingly an increased service life.

A still further object of the present invention is to provide a thin type pump structure that largely reduces the noise production.

To achieve the above and other objects, the thin type pump structure provided according to the present invention includes a pump housing, a rotor assembly, a stator assembly, a flow-guiding plate, and a closing member. The pump housing has a first side defining an open-topped pump chamber, in which a forward projected shaft is formed; and an opposite second side defining an open-bottomed annular recess at an area opposite to and around the pump chamber. The rotor assembly has a pivot hole and is correspondingly received in the pump chamber with the pivot hole turnably located around the shaft. The rotor assembly includes a blade wheel and a magnetic element located behind the blade wheel. The stator assembly is received in the annular recess to horizontally face toward the magnetic element, enabling mutual electromagnetic induction and magnetic field generation between the magnetic element and the stator assembly. Further, the stator assembly includes a plurality of poles, a radial outer end of each of the poles is wound with a plurality of coils, and a radial inner end of each of the poles is formed into a magnetically sensitive section. The flow-guiding plate covers the open top of the pump chamber, and the closing member closes the pump housing from the first side thereof.

When the thin type pump structure according to the present invention having the above-described structural design starts operating, the magnetically sensitive sections formed at the radially inner ends of the poles of the stator assembly and the magnetic element of the rotor assembly electromagnetically induce one another to generate a magnetic field between them. At this point, a first annular space is formed between the pivot hole of the rotor assembly and the shaft in the pump housing, and a second annular space is formed between an outer circumferential wall surface of the rotator assembly and an inner circumferential wall surface of the pump chamber, bringing the rotor assembly to float in the pump chamber by magnetic levitation and be magnetically driven to rotate continuously in the pump chamber. Since the rotor assembly in operating is suspended in the pump chamber by magnetic levitation, no frictional contact between the rotor assembly and the pump housing will occur to thereby reduce the mechanical wearing rate and largely increase the service life of the thin type pump structure. In addition, parts like bearings and some fixing means that are required in the conventional pump structures can be omitted according to the present invention to largely reduce the manufacturing cost of the thin type pump structure. Noise problem in the conventional pump structures caused by the frictional contact between the bearings and the rotor shaft can also be eliminated.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The present invention will now be described with a preferred embodiment thereof and by referring to the accompanying drawings.

Figure 1:
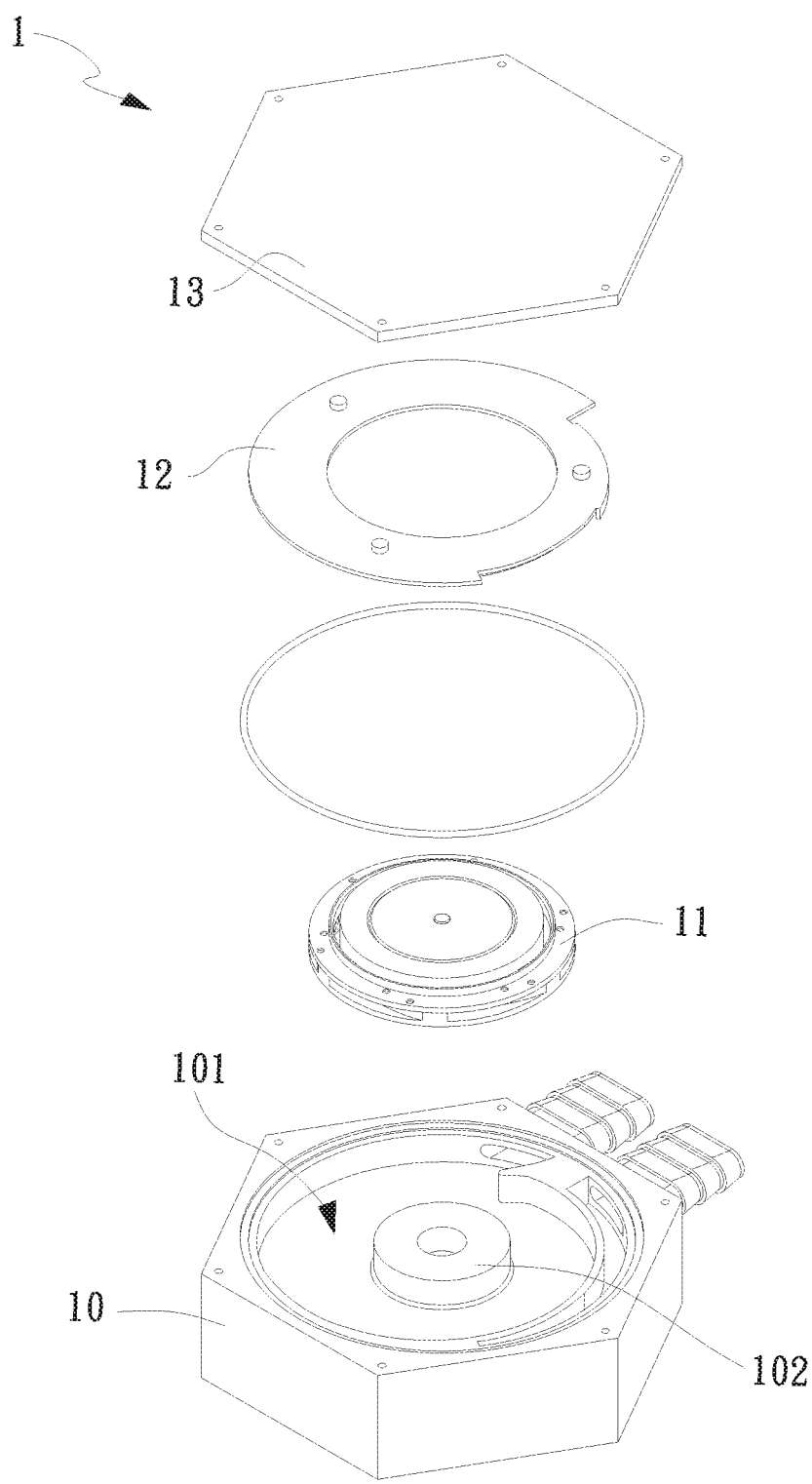
FIG. 1 is an exploded perspective view of a conventional pump structure.
Figure 2:
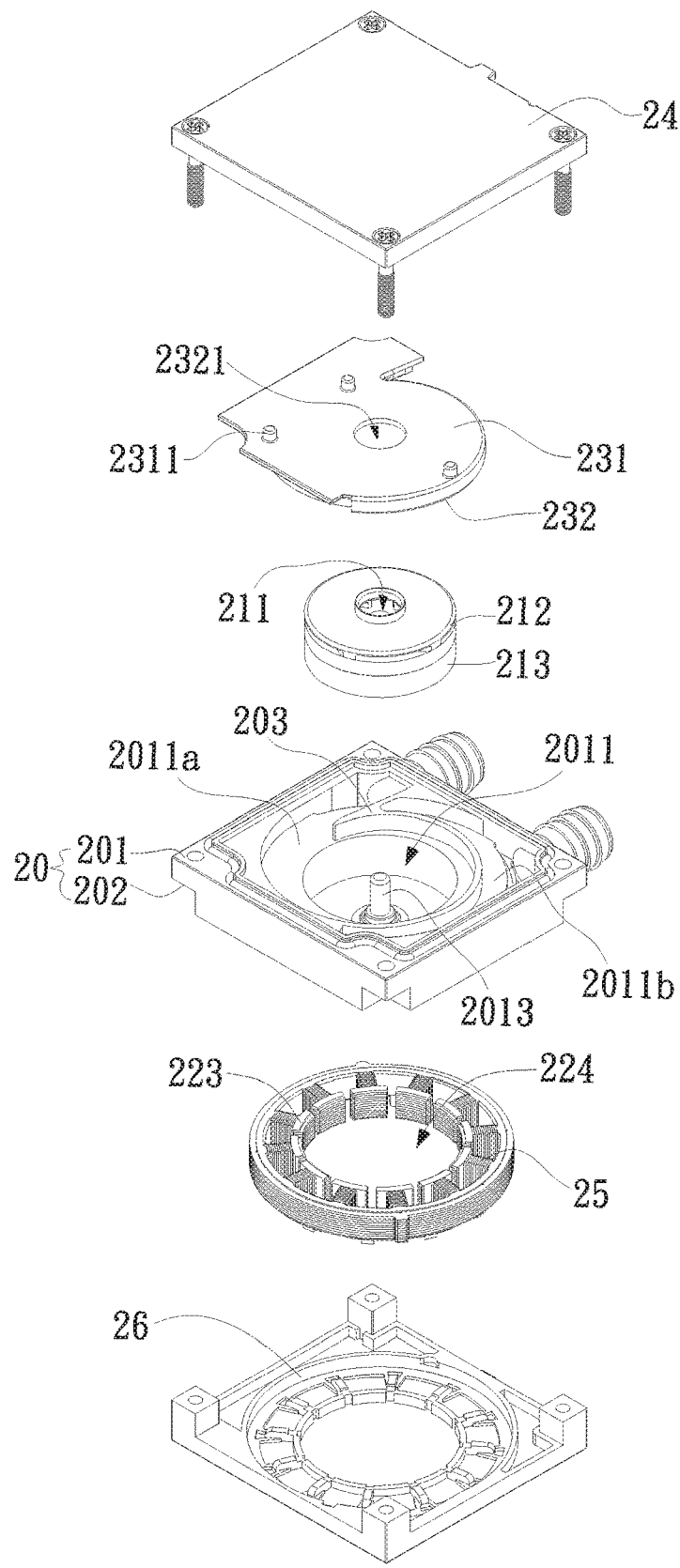
FIG. 2 is an exploded top perspective view of a thin type pump structure according to a preferred embodiment of the present invention.
Figure 3:
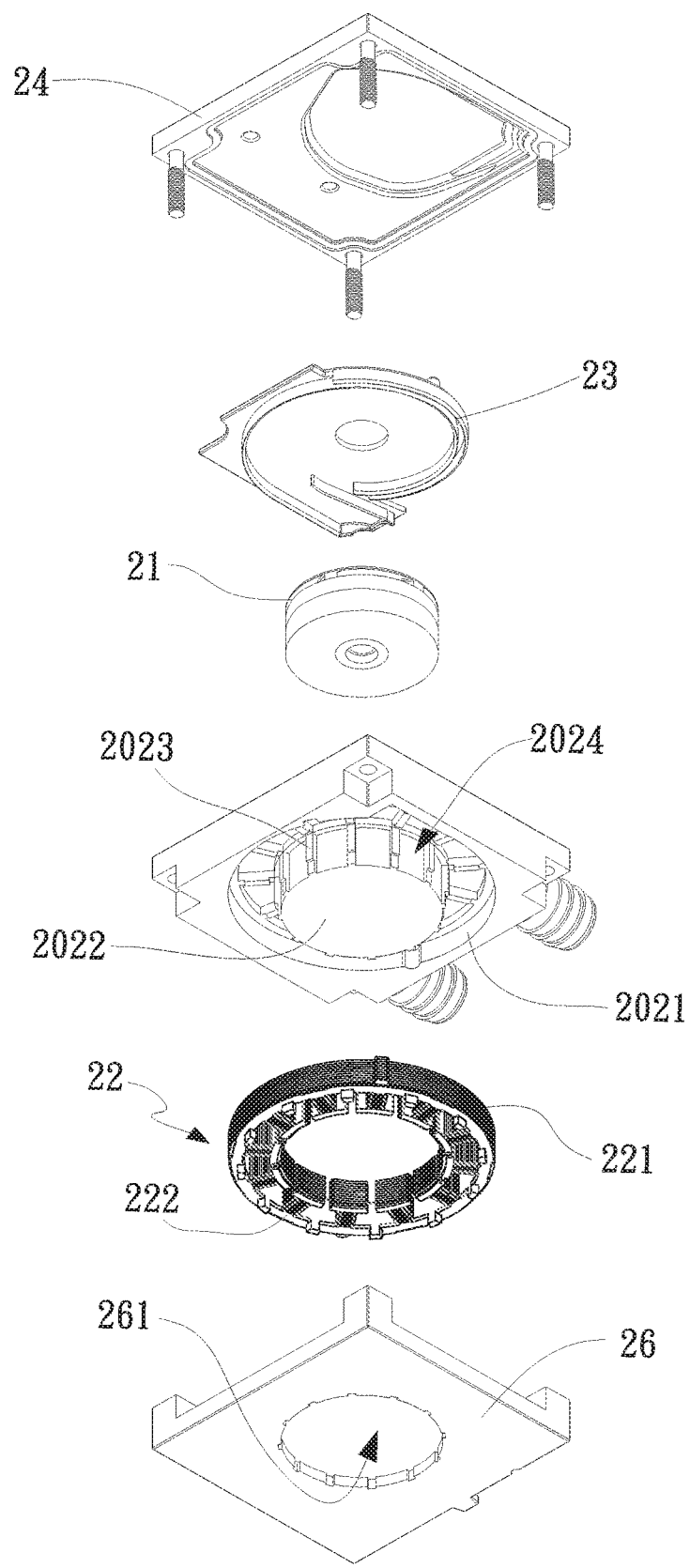
FIG. 3 is an exploded bottom perspective view of the thin type pump structure according to the preferred embodiment of the present invention shown in FIG. 2.
Figure 4:
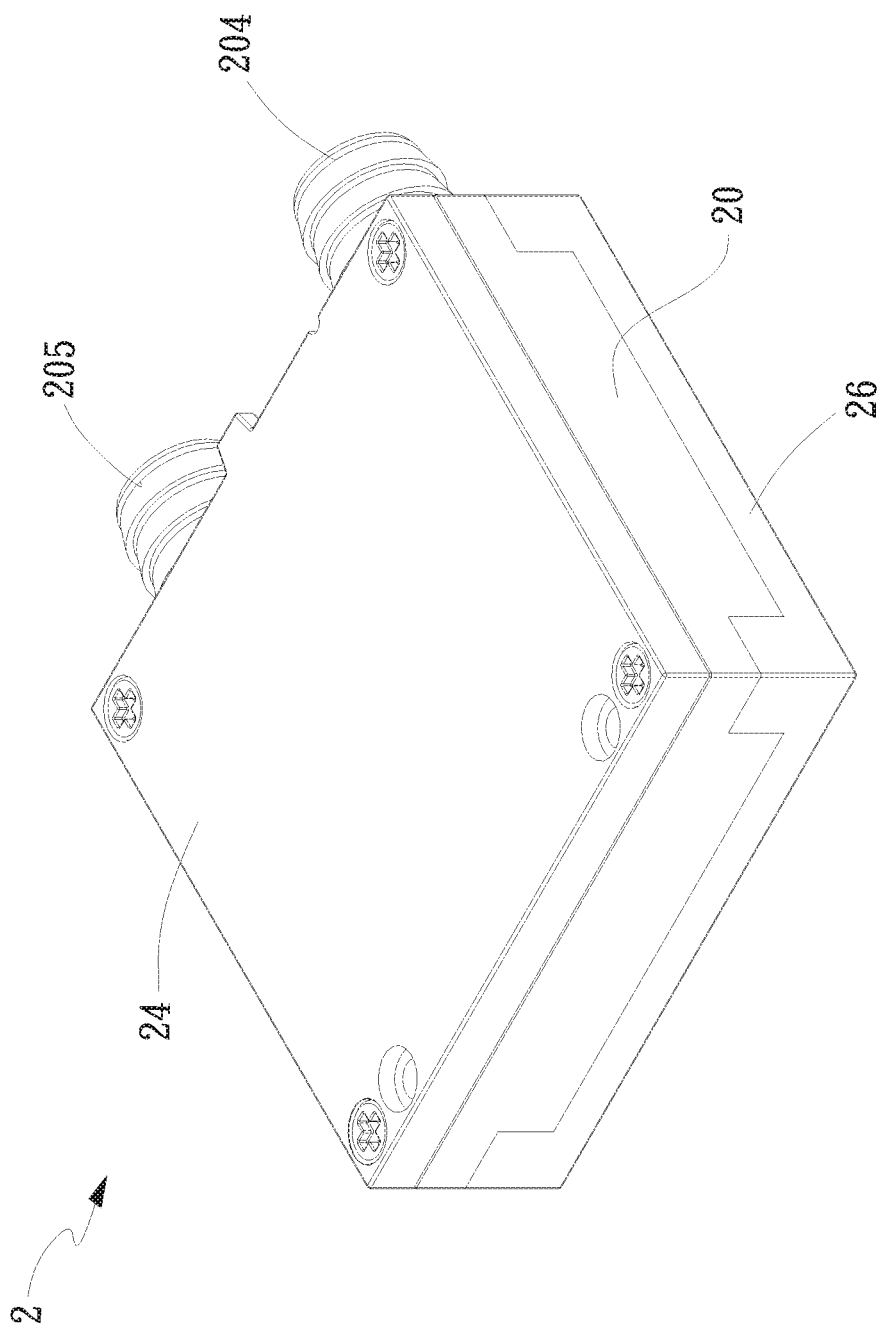
FIG. 4 is an assembled perspective view of the thin type pump structure according to the preferred embodiment of the present invention shown in FIGS. 2 and 3.
Figure 5:
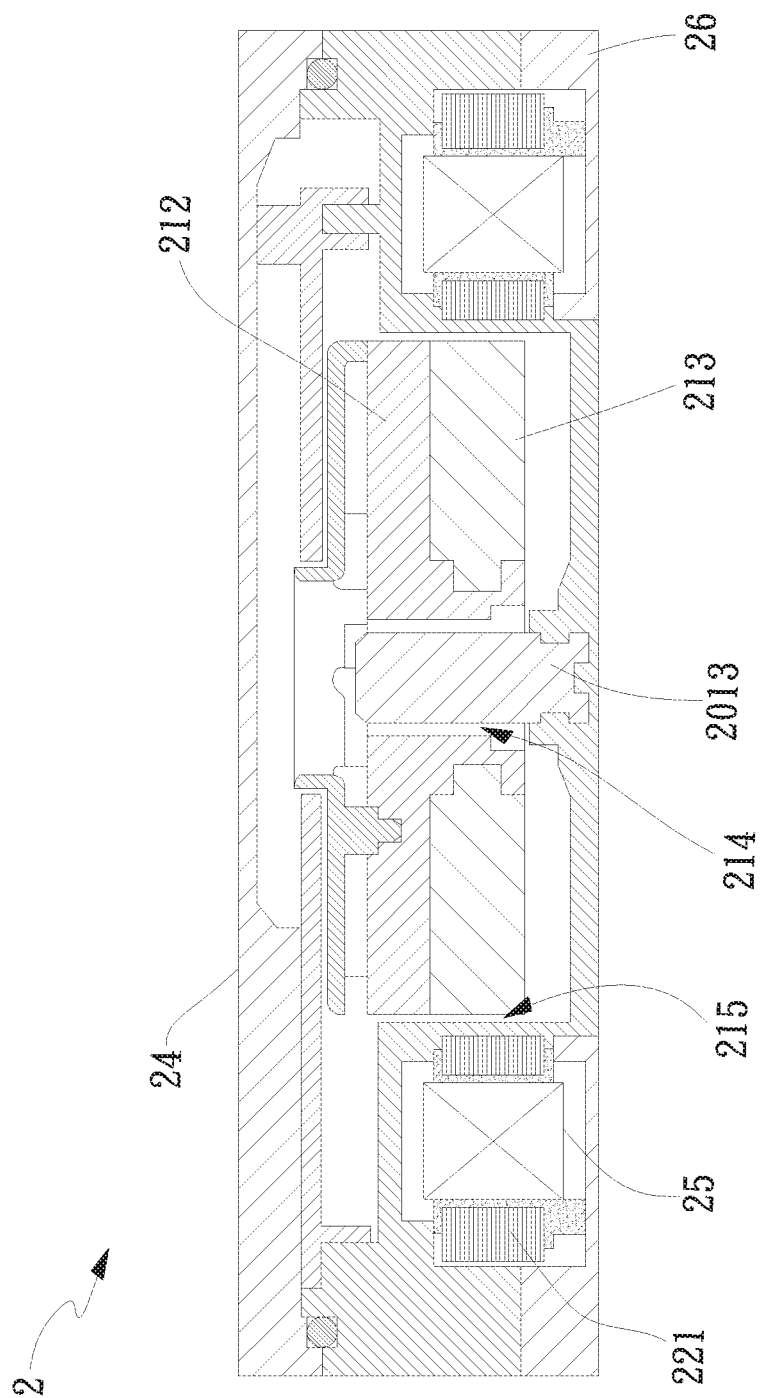
FIG. 5 is a sectional view of the thin type pump structure shown in FIG. 4.

Please refer to FIGS. 2 to 5 at the same time, wherein FIGS. 2 and 3 are exploded top and bottom perspective views, respectively, of a thin type pump structure 2 according to a preferred embodiment of the present invention; and FIGS. 4 and 5 are assembled perspective and sectional views, respectively, of the thin type pump structure 2 shown in FIGS. 2 and 3. As shown, the thin type pump structure 2 includes a pump housing 20, a rotor assembly 21, a stator assembly 22, a flow-guiding plate 23, and a closing member 24. The pump housing 20 has a first side 201, which is the upper side in the drawings, and an opposite second side 202, which is a lower side in the drawings. The first side 201 of the pump housing 20 defines an open-topped pump chamber 2011, in which a forward projected shaft 2013 is formed. An area of the second side 202 opposite to and around the pump chamber 2011 forms an open-bottomed annular recess 2021, such that a radially inner circumferential wall of the annular recess 2021 and an area of the second side 202 surrounded by the annular recess 2021 together serve as a fitting section 2022. A plurality of circumferentially spaced and axially extended ribs 2023 is formed on an outer circumferential surface of the fitting section 2022, i.e. on the radially inner circumferential wall of the annular recess 2021, such that a receiving section 2024 is formed between any two adjacent ribs 2023.

The pump housing 20 further includes a partitioning section 203, which divides the pump chamber 2011 into a first chamber 2011a and a second chamber 2011b. A water inlet 204 and a water outlet 205 are provided on an outer side of the pump housing 20 to communicate with the second chamber 2011b and the first chamber 2011a, respectively.

The rotor assembly 21 is provided with a pivot hole 211 and is correspondingly received in the pump chamber 2011 with the pivot hole 211 turnably located around the shaft 2013. The rotor assembly 21 includes a blade wheel 212 and a magnetic element 213 located behind the blade wheel 212. The rotor assembly 21 is received in the pump chamber 2011 with a first annular space 214 formed between the pivot hole 211 and an outer circumferential wall surface of the shaft 2013 as well as a second annular space 215 formed between an outer circumferential wall surface of the rotator assembly 21 and an inner circumferential wall surface of the pump chamber 2011. The first and the second annular space 214, 215 are communicable with the pump chamber 2011.

The stator assembly 22 consists of a plurality of silicon steel sheets 221 and has a through hole 224 defined at a center thereof. The stator assembly 22 is received in the annular recess 2021 with the through hole 224 correspondingly fitted around the fitting section 2022. Further, the stator assembly 22 includes a plurality of poles 222. A radial outer end of each of the poles 222 is wound with a plurality of coils 25, and a radial inner end of each of the poles 222 forms into a magnetically sensitive section 223. The magnetically sensitive sections 223 are correspondingly located in the receiving sections 2024, such that the magnetically sensitive sections 223 and the magnetic element 213 horizontally face toward one another. This arrangement enables mutual electromagnetic induction and magnetic field generation between the rotor assembly 21 and the stator assembly 22.

The pump housing 20 further includes a stator cover 26 for correspondingly covering the stator assembly 22 from a bottom side thereof. The stator cover 26 includes an opening 261 that communicates with the through hole 224 of the stator assembly 22 and is correspondingly fitted around the fitting section 2022.

The flow-guiding plate 23 has a top surface 231 and a bottom surface 232. The closing member 24 is used to correspondingly cover the pump housing 20 from the first side 201 thereof. The flow-guiding plate 23 has at least one raised portion 2311 formed on the top surface 231 to press against the closing member 24, and the bottom surface 232 of the flow-guiding plate 23 correspondingly covers the open top of the pump chamber 2011. A hole 2321 is extended through the top surface 231 and the bottom surface 232 to communicate with the pivot hole 211 of the rotor assembly 21.

When the thin type pump structure 2 according to the present invention having the above-described structural design starts operating, the magnetically sensitive sections 223 formed at the radially inner ends of the poles 222 of the stator assembly 22 and the magnetic element 213 of the rotor assembly 21 electromagnetically induce one another to generate a magnetic field between them. At this point, with the existence of the first and the second annular space 214, 215, the rotor assembly 21 can float in the pump chamber 2011 by magnetic levitation and be magnetically driven to rotate continuously in the pump chamber 2011. Since the rotor assembly 21 in operating is suspended in the pump chamber 2011 by magnetic levitation, no frictional contact between the rotor assembly 21 and the pump housing 20 will occur to thereby reduce the mechanical wearing rate and largely increase the service life of the thin type pump structure 2. In addition, parts like bearings and some fixing means that are required in the conventional pump structures can be omitted according to the present invention to largely reduce an overall volume of the thin type pump structure 2, allowing it to have a further reduced overall thickness and be manufactured at a reduced cost. Noise problem in the conventional pump structures caused by the frictional contact between the bearings and the rotor shaft can also be eliminated.

In brief, compared to the conventional pump structures, the thin type pump structure of the present invention has the following advantages: (1) a largely reduced overall volume; (2) a largely reduced overall thickness; (3) a largely reduced manufacturing cost; (4) a largely lowered wearing rate and increased service life; and (5) largely reduced noise production.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A pump structure, comprising: a pump housing having a first side and an opposite second side; the first side defining an open-topped pump chamber, in which a forward projected shaft is formed; and an area of the second side opposite to and around the pump chamber forming an open-bottomed annular recess; a rotor assembly being provided with a pivot hole and correspondingly received in the pump chamber such that the pivot hole is rotatably mounted around the shaft, a first annular space being formed between an inner surface of the pivot hole and an outer circumferential wall surface of the shaft and a second annular space being formed between an outer circumferential wall surface of the rotor assembly and an inner circumferential wall surface of the pump chamber; the rotor assembly including a blade wheel and a magnetic element, and the magnetic element being located behind the blade wheel;

wherein no bearing is provided between the inner surface of the pivot hole and the outer circumferential wall surface of the shaft; a stator assembly being correspondingly received in the annular recess of the pump housing, such that the stator assembly and the magnetic element of the rotor assembly horizontally face toward one another, enabling mutual electromagnetic induction and magnetic field generation between them to levitate the rotor assembly between the first annular space and the second annular space so as to float in the pump chamber during rotation thereof, a flow-guiding plate having a through hole in communication with the pivot hole, a bottom surface of the flow-guiding plate attaching to the first side of the pump housing to cover the pump chamber; and a closing member correspondingly covering both the pump housing from the first side thereof and a uppermost surface of the flow-guiding plate to close the pump chamber.

2. The pump structure as claimed in claim 1, wherein the annular recess of the pump housing has a radially inner wall that together with an area of the second side of the pump housing surrounded by the annular recess serve as a fitting section; a plurality of circumferentially spaced and axially extended ribs being formed on an outer circumferential surface of the fitting section, such that a receiving section is formed between any two adjacent ribs; and wherein the stator assembly consists of a plurality of silicon steel sheets and has a through hole defined at a center thereof; and the stator assembly being received in the annular recess with the through hole correspondingly fitted around the fitting section.

3. The pump structure as claimed in claim 2, wherein the stator assembly includes a plurality of poles, and a radially outer end of each of the poles is wound with a plurality of coils.

4. The pump structure as claimed in claim 3, wherein the poles of the stator assembly respectively have a radially inner end formed into a magnetically sensitive section; the magnetically sensitive sections being correspondingly located in the receiving sections on the fitting section, such that the magnetically sensitive sections of the stator assembly and the magnetic element of the rotor assembly horizontally face toward one another, enabling mutual electromagnetic induction and magnetic field generation between them.

5. The pump structure as claimed in claim 2, wherein the pump housing further includes a stator cover correspondingly covering the stator assembly from a bottom side thereof; and the stator cover including an opening that communicates with the through hole of the stator assembly and is correspondingly fitted around the fitting section.

6. The pump structure as claimed in claim 1, wherein the flow-guiding plate has a top surface and a bottom surface; the top surface having at least one raised portion formed thereon to press against the closing member that covers the pump housing; and the bottom surface correspondingly covering the pump chamber.

7. The pump structure as claimed in claim 6, wherein the through hole extends through the top surface and the bottom surface to communicate with the pivot hole of the rotor assembly.

8. The pump structure as claimed in claim 1, wherein the pump housing further includes a partitioning section, which divides the pump chamber into a first chamber and a second chamber; and a water inlet and a water outlet provided on an outer side of the pump housing communicate with the second chamber and the first chamber, respectively.

* * * * *